United States Patent
Ohta et al.

(10) Patent No.: US 10,240,226 B2
(45) Date of Patent: Mar. 26, 2019

(54) STEEL PLATE FOR THICK-WALLED STEEL PIPE, METHOD FOR MANUFACTURING THE SAME, AND THICK-WALLED HIGH-STRENGTH STEEL PIPE

(71) Applicant: JFE STEEL CORPORATION, Tokyo (JP)

(72) Inventors: Shusaku Ohta, Fukuyama (JP); Junji Shimamura, Kawasaki (JP); Nobuyuki Ishikawa, Fukuyama (JP); Shigeru Endo, Tokyo (JP); Seishi Tsuyama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 490 days.

(21) Appl. No.: 14/780,769

(22) PCT Filed: Mar. 27, 2014

(86) PCT No.: PCT/JP2014/001801
§ 371 (c)(1),
(2) Date: Sep. 28, 2015

(87) PCT Pub. No.: WO2014/156175
PCT Pub. Date: Oct. 2, 2014

(65) Prior Publication Data
US 2016/0053354 A1 Feb. 25, 2016

(30) Foreign Application Priority Data
Mar. 29, 2013 (JP) .................. 2013-070955

(51) Int. Cl.
*C22C 38/58* (2006.01)
*B21C 37/08* (2006.01)
(Continued)

(52) U.S. Cl.
CPC .............. *C22C 38/58* (2013.01); *B21C 37/08* (2013.01); *C21D 6/001* (2013.01); *C21D 6/004* (2013.01);
(Continued)

(58) Field of Classification Search
None
See application file for complete search history.

(56) References Cited

U.S. PATENT DOCUMENTS

2012/0018028 A1* 1/2012 Shimamura ............. B21C 37/08
138/142
2012/0305122 A1* 12/2012 Ishikawa ............... B23K 9/0282
138/177

FOREIGN PATENT DOCUMENTS

CA        2811189       3/2012
CN      101942602       1/2011
(Continued)

OTHER PUBLICATIONS

Korean Office Action for Korean Application No. 10-2015-7029182, dated Jun. 8, 2017, with Concise Statement of Relevance of Office Action, 4 pages.
(Continued)

Primary Examiner — Daniel J. Schleis
(74) Attorney, Agent, or Firm — RatnerPrestia

(57) ABSTRACT

A steel plate has a chemical composition containing, by mass %, C: 0.03% or more and 0.10% or less, Si: 0.05% or more and 0.50% or less, Mn: 1.00% or more and 2.00% or less, P: 0.015% or less, S: 0.005% or less, Mo: 0.20% or less (including 0%), Nb: 0.01% or more and 0.05% or less, and the balance being Fe and inevitable impurities, and, if desired, containing, by mass %, one or more of Al: 0.005% or more and 0.1% or less, Cu: 1.00% or less, Ni: 1.00% or less, Cr: 0.50% or less, and V: 0.05% or less, in which Pcm* (%) (=C+Si/30+(Mn+Cu+Cr)/20+Ni/60+Mo/2+V/10) is
(Continued)

0.20 or less. The steel plate has a volume fraction of bainite in a base material of 50% or more, and has a volume fraction of island martensite (MA) in a coarse-grain region reheated in a dual-phase temperature range of 5.0% or less. A slab having the chemical composition described above that is cast using a continuous casting method is reheated at a specified temperature, hot-rolled, and then subjected to accelerated cooling to a temperature of 550° C. or lower and 250° C. or higher.

4 Claims, 1 Drawing Sheet

(51) Int. Cl.
| | |
|---|---|
| C22C 38/00 | (2006.01) |
| C22C 38/12 | (2006.01) |
| C21D 8/02 | (2006.01) |
| C21D 9/14 | (2006.01) |
| C22C 38/02 | (2006.01) |
| C22C 38/04 | (2006.01) |
| C22C 38/06 | (2006.01) |
| C22C 38/08 | (2006.01) |
| C22C 38/16 | (2006.01) |
| C22C 38/42 | (2006.01) |
| C22C 38/44 | (2006.01) |
| C22C 38/46 | (2006.01) |
| C22C 38/48 | (2006.01) |
| C21D 6/00 | (2006.01) |
| C21D 9/46 | (2006.01) |
| F16L 9/02 | (2006.01) |
| F16L 9/17 | (2006.01) |

(52) U.S. Cl.
CPC .............. *C21D 6/005* (2013.01); *C21D 6/008* (2013.01); *C21D 8/021* (2013.01); *C21D 8/0263* (2013.01); *C21D 9/14* (2013.01); *C21D 9/46* (2013.01); *C22C 38/00* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/42* (2013.01); *C22C 38/44* (2013.01); *C22C 38/46* (2013.01); *C22C 38/48* (2013.01); *F16L 9/02* (2013.01); *F16L 9/17* (2013.01); *C21D 8/0226* (2013.01); *C21D 2211/002* (2013.01)

(56) References Cited

FOREIGN PATENT DOCUMENTS

| | | |
|---|---|---|
| CN | 102112643 | 6/2011 |
| CN | 102308013 | 1/2012 |
| EP | 1860204 | 11/2007 |
| EP | 1978121 | 10/2008 |
| EP | 2093302 | 8/2009 |
| EP | 2309014 | 4/2011 |
| EP | 2395122 | 12/2011 |
| EP | 2407568 | 1/2012 |
| EP | 2444510 | 4/2012 |
| EP | 2505681 | 10/2012 |
| EP | 2505682 | 10/2012 |
| EP | 2532765 | 12/2012 |
| JP | 52120911 | 10/1977 |
| JP | 05186823 | 7/1993 |
| JP | 0577740 | 10/1993 |
| JP | 2004263248 | 9/2004 |
| JP | 2011132601 | 7/2011 |
| JP | 2012077325 * | 4/2012 |
| JP | 2012077327 | 4/2012 |
| JP | 2012122093 | 6/2012 |
| JP | 2012237042 | 12/2012 |
| JP | 2012241267 | 12/2012 |
| JP | 2013007101 | 1/2013 |
| WO | WO2011065578 * | 6/2011 |

OTHER PUBLICATIONS

Chinese Office Action for Patent Application No. 201480018541.5, dated Apr. 29, 2016, 11 pages.
European Search Report for European Application No. 14775694.4, dated Feb. 5, 2016, 9 pages.
International Search Report for International Application No. PCT/JP2014/001801 dated Jun. 10, 2014.
Korean Office Action for Application No. 10-2015-7029182, dated Sep. 23, 2016, 7 pages.
Extended European Search Report dated Feb. 1, 2016 for European Application No. 14773760.5-1373.
Chinese Office Action with partial English language translation for Application No. 201480018541.5, dated Dec. 12, 2016, 9 pages.

* cited by examiner

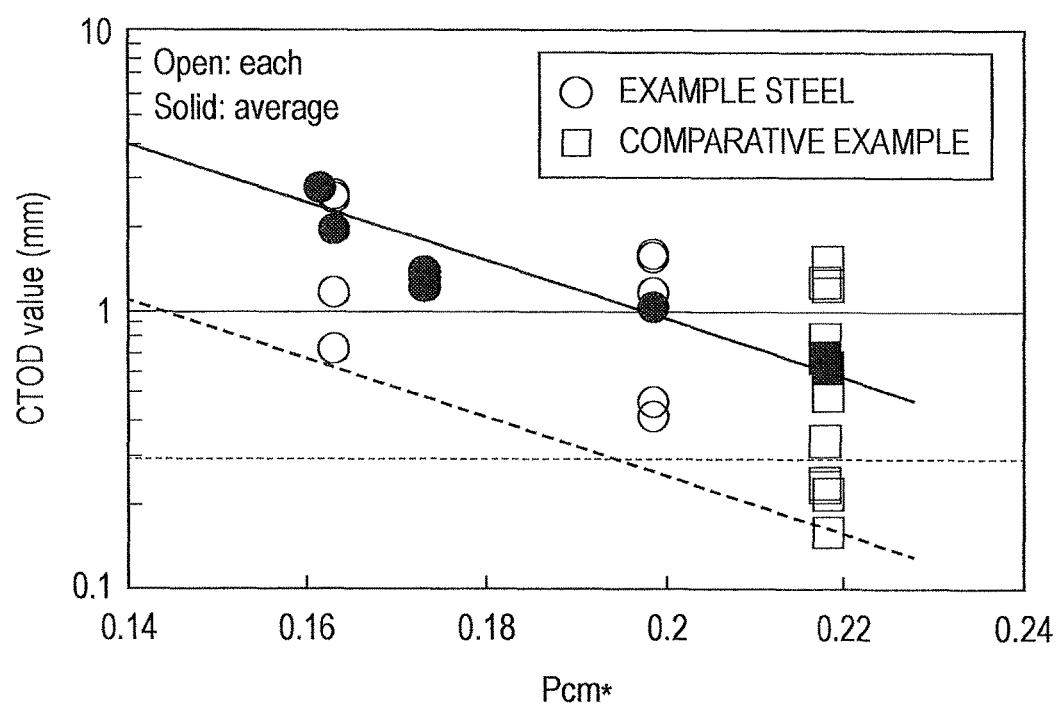

STEEL PLATE FOR THICK-WALLED STEEL PIPE, METHOD FOR MANUFACTURING THE SAME, AND THICK-WALLED HIGH-STRENGTH STEEL PIPE

CROSS-REFERENCE TO RELATED APPLICATIONS

This is the U.S. National Phase application of PCT International Application No. PCT/JP2014/001801, filed Mar. 27, 2014, and claims priority to Japanese Patent Application No. 2013-070955, filed Mar. 29, 2013, the disclosures of each of these applications being incorporated herein by reference in their entireties for all purposes.

FIELD OF THE INVENTION

The present invention relates to a steel plate for a thick-walled steel pipe, a method for manufacturing the steel plate, and a thick-walled high-strength steel pipe. The thick-walled high-strength steel pipes according to the present invention can preferably be used for marine structures and line pipes having a TS of 500 MPa or more. In addition, among the steel plates for thick-walled steel pipes according to aspects of the present invention, steel plates for thick-walled steel pipes having a thickness of 25 mm or more are, in particular, with excellent CTOD performance in a heat affected zone formed as a result of performing girth welding, which involves multi-pass welding, when steel pipes are joined.

BACKGROUND OF THE INVENTION

Steel pipes for marine structures and line pipes are subjected to girth welding in order to join the steel pipes in a process for forming the structures. Girth welding is welding in the circumferential direction of the steel pipes and is a process which is indispensable in the process for forming the structures. Therefore, from the viewpoint of safety of the structures, such steel pipes are required to be excellent in terms of the toughness of a weld zone formed as a result of performing girth welding, in addition to being excellent in terms of the toughness of a base material.

Girth welding mentioned above usually involves low- to medium-heat input multi-pass welding (also referred to as multilayer welding). In the case of multi-pass welding, a heat affected zone is composed of regions which have been subjected to various thermal histories.

In a bond, which has been formed in the first welding heat cycle of multilayer welding, that is, a coarse-grain region in the vicinity of the boundary between a weld metal and a heat affected zone, island martensite (also referred as MA (an abbreviation for Martensite Austenite constituent)) is formed in a region which is reheated at a temperature in a temperature range for forming a ferrite-austenite dual phase (hereinafter, also simply referred to as a dual-phase temperature range) due to a subsequent welding heat cycle (also referred to as coarse-grain region reheated in a dual-phase temperature range). In the case where island martensite is formed, there is a significant decrease in toughness. The coarse-grain region reheated in a dual-phase temperature range is the region having the lowest toughness in the heat affected zone formed as a result of performing multilayer welding.

As a countermeasure against a decrease in toughness in a coarse-grain region reheated in a dual-phase temperature range, a technique in which the strength of base material is increased by adding Cu, while inhibiting the formation of MA as a result of decreasing C content and decreasing Si content, has been proposed (for example, Patent Literature 1).

In addition, since a bond is exposed to a high temperature immediately below the melting point, an austenite grain size increases the most in the bond. In addition, since the microstructure in the bond tends to transform into an upper bainite structure due to subsequent cooling, there is a decrease in toughness.

As a measure for increasing the toughness of a bond, a technique in which TiN is finely dispersed in steel in order to inhibit the growth of austenite grain or in order to utilize the TiN as a ferrite nucleation site has been put into practice.

Patent Literature 2 discloses a technique in which the toughness of a heat affected zone is increased by the fine dispersion of ferrite nucleation sites as a result of crystallizing CaS. In addition, Patent Literature 2 proposes a technique in which the technique described in Patent Literature 2 is combined with a technique in which Ti oxides are dispersed (for example, Patent Literature 3) or combined with the ferrite nucleation capability of BN and the dispersion of oxides. Moreover, Patent Literature 2 also proposes a technique in which high toughness is achieved by adding Ca and REM in order to control the shape of sulfides.

As a criterion for evaluating the toughness of steel, absorbed energy in a Charpy test has mainly been used to date. There is a case where it is required to conduct a CTOD test (an abbreviation for Crack Tip Opening Displacement test) in order to evaluate the toughness of steel for increased reliability. In a CTOD test, resistance to the occurrence of a brittle fracture is evaluated by performing a three-point bending test on a test piece having a fatigue crack in an evaluated portion and by determining the amount of opening (the amount of plastic deformation) at a crack bottom immediately before the occurrence of a fracture.

CTOD performance indicates the toughness of a small region at the crack bottom. In order to satisfy the strict requirement for the CTOD performance of a bond formed as a result of performing girth welding, it is necessary to increase the toughness of a coarse-grain region reheated in a dual-phase temperature range which is a region in a heat affected zone and in which there is a decrease in toughness.

PATENT LITERATURE

[PTL 1] Japanese Unexamined Patent Application Publication No. 5-186823
[PTL 2] Japanese Unexamined Patent Application Publication No. 2004-263248
[PTL 3] Japanese Examined Patent Application Publication No. 5-77740

SUMMARY OF THE INVENTION

However, there has been an increase in the strength and wall thickness of steel pipes which are used nowadays because of the environment in which they are being used, an increase in the size of structures, and the like. Accordingly, there is a tendency toward increase in the contents of alloying chemical elements. Therefore, it is difficult to apply the technique according to Patent Literature 1 which is a technique for achieving satisfactory toughness for a heat affected zone.

In addition, among the alloying chemical elements, Ni is a chemical element which increases the strength of a base material and which increases the toughness of a heat affected zone (in the present description, "heat affected zone" refers to a heat affected zone in a weld zone). From this point of view, it is preferable that Ni be added to a steel plate for a thick-walled steel pipe. However, since Ni is an expensive alloying chemical element, an increase in the Ni content increases manufacturing costs. It is difficult to add a large amount of Ni to steel plates as base plates for steel pipes which are manufactured in large quantity.

An object of the present invention is, solving the problems with conventional techniques described above, to provide a steel plate for a thick-walled steel pipe with excellent CTOD performance in a heat affected zone (HAZ) formed as a result of performing multi-pass welding, a method for manufacturing the steel plate for a thick-walled steel pipe, and a thick-walled high-strength steel pipe which is manufactured using the steel plate for a thick-walled steel pipe.

Here, in the present invention, "with excellent CTOD performance" refers to a case where a CTOD value obtained at a temperature of −10° C. is 0.30 mm or more when a CTOD test for a heat affected zone formed as a result of performing multi-pass welding is performed on a test piece having a notch (a fatigue crack) in a coarse-grain region reheated in a dual-phase temperature range in accordance with API Recommended Practice 2Z (hereinafter, abbreviated as API RP 2Z). This value is specified in API RP 2Z in the case of a steel material having a thickness of 76 mm or less and a standard lower limit for yield stress of 420 MPa.

The present inventors conducted investigations regarding the relationship between a chemical composition and a CTOD value in order to increase a CTOD value by inhibiting the formation of MA in a heat affected zone and obtained the following knowledge.

1. Weld crack sensitivity composition Pcm is an index for evaluating cold cracking at welding, and it is generally known that the toughness of a heat affected zone of a material increases with decreasing Pcm. However, in the case of a CTOD test, there is a case where a CTOD value is low even though Pcm of the material is low. Mo content has a significant influence on the toughness of a heat affected zone.

2. It is possible to control the CTOD value of a heat affected zone formed as a result of performing multi-pass welding using Pcm* (%) (=C+Si/30+(Mn+Cu+Cr)/20+Ni/60+Mo/2+V/10, where atomic symbols respectively represent the contents (mass %) of the corresponding alloying chemical elements in the equation, and where the symbol of an alloying chemical element which is not contained is assigned a value of 0) which is obtained using a new equation derived by changing the coefficient of Mo in the equation for Pcm.

Embodiments of the present invention have been completed on the basis of the knowledge described above, and further investigations, and include the following.

1. A steel plate for a thick-walled steel pipe with excellent CTOD performance in a heat affected zone formed as a result of performing girth welding, the steel plate having chemical composition containing, by mass %, C: 0.030% or more and 0.10% or less, Si: 0.05% or more and 0.50% or less, Mn: 1.00% or more and 2.00% or less, P: 0.015% or less, S: 0.005% or less, Mo: 0.20% or less (including 0%), Nb: 0.01% or more and 0.05% or less, and the balance being Fe and inevitable impurities, in which Pcm* (%) (=C+Si/30+(Mn+Cu+Cr)/20+Ni/60+Mo/2+V/10, where atomic symbols respectively represent the contents (mass %) of the corresponding alloying chemical elements in the equation, and where the symbol of an alloying chemical element which is not contained is assigned a value of 0) is 0.20 or less, having a volume fraction of bainite in a base material of 50% or more, and having a volume fraction of island martensite (MA) in a coarse-grain region reheated in a dual-phase temperature range of 5.0% or less.

2. The steel plate for a thick-walled steel pipe with excellent CTOD performance in a heat affected zone formed as a result of performing girth welding according to item 1, the steel plate having the chemical composition further containing, by mass % one or more of Al: 0.005% or more and 0.1% or less, Cu: 1.00% or less, Ni: 1.00% or less, Cr: 0.50% or less, and V: 0.05% or less.

3. A method for manufacturing a steel plate for a thick-walled steel pipe with excellent CTOD performance in a heat affected zone formed as a result of performing girth welding, the method including manufacturing a steel slab having the chemical composition according to item 1 or 2 using a continuous casting method, subsequently reheating the slab at a temperature of 1050° C. or higher and 1200° C. or lower, then hot-rolling the reheated slab, and performing accelerated cooling on the hot-rolled steel plate to a temperature of 550° C. or lower and 250° C. or higher after hot rolling has been performed.

4. A thick-walled high-strength steel pipe with excellent CTOD performance in a heat affected zone formed as a result of performing girth welding, the steel pipe being manufactured by forming the steel plate for a thick-walled steel pipe according to item 1 or 2 into a cylindrical shape by performing cold forming, and by performing seam welding on butted surfaces with one weld layer being formed on each of the inner and outer surfaces in order to form a steel pipe.

5. The thick-walled high-strength steel pipe with excellent CTOD performance in a heat affected zone formed as a result of performing girth welding according to item 4, in which the girth welding is multilayer welding performed with a heat input per pass of 5 kJ/cm or more and 70 kJ/cm or less.

In the case where the steel plate for a thick-walled steel pipe according to the present invention is welded by performing, for example, girth welding, which is a kind of low- to medium-heat input multi-pass welding, the heat affected zone has excellent CTOD performance. Therefore, the steel plate for a thick-walled steel pipe according to the present invention can suitably be used as a base plate of a thick-walled high-strength steel pipe for marine structures, pipe lines, and the like which are used in harsh environments and which are required to have high toughness in a heat affected zone. Therefore, the present invention is significantly effective in industry.

BRIEF DESCRIPTION OF THE DRAWINGS

FIG. 1 is a diagram illustrating the relationship between Pcm* and a CTOD value.

DETAILED DESCRIPTION OF EMBODIMENTS OF THE INVENTION

Embodiments of the present invention relate to a chemical composition and a microstructure.

Chemical Composition:

% represents mass % in the description.

C: 0.030% or More and 0.10% or Less

It is necessary that the C content be decreased in order to inhibit the formation of MA which is formed in the heat affected zone of a weld zone. On the other hand, C is necessary as a steel-strengthening chemical element. Therefore, the C content is advantageously set to be 0.030% or more and 0.10% or less. It is preferable that the C content be 0.04% or more in order to achieve sufficient strength of steel. It is preferable that the C content be 0.08% or less from the viewpoint of inhibiting the formation of MA.

Si: 0.05% or More and 0.50% or Less

Si is used as a deoxidation element, and it is desirable that the Si content be 0.05% or more. On the other hand, in the case where the Si content is more than 0.50%, since the formation of MA is promoted, there is a decrease in the toughness of a base material. Therefore, it is advantageous to limit the Si content to 0.50% or less, or preferably 0.30% or less.

Mn: 1.00% or More and 2.00% or Less

It is desirable that the Mn content be 1.00% or more in order to achieve sufficient strength for a base material, or preferably 1.20% or more. On the other hand, in the case where the Mn content is more than 2.00%, there is a significant decrease in the toughness of a weld zone. Therefore, it is desirable that the Mn content be 2.00% or less, or preferably 1.80% or less. It is more preferable that the Mn content be 1.20% or more and 1.80% or less.

P: 0.015% or Less

In the case where the P content is more than 0.015%, there is a decrease in the toughness of a weld zone. Therefore, the P content is advantageously limited to 0.015% or less, or preferably 0.012% or less.

S: 0.005% or Less

In the case where the S content is more than 0.005%, there is a decrease in the toughness of a weld zone and a base material. Therefore, the S content is advantageously set to be 0.005% or less, or preferably 0.0035% or less.

Mo: 0.20% or Less (Including 0%)

Mo is a chemical element which is effective for increasing the strength of a base material. Such effect is realized in the case where the Mo content is 0.01% or more. In the case where the Mo content is excessively large, since MA is formed, there is a negative effect on toughness. Therefore, in the case where Mo is added, the upper limit of the Mo content is desirably set to be 0.20%. In the case where Mo is added, there may be a negative effect, in particular, on CTOD performance. Therefore, it is preferable that the Mo content be 0.10% or less, or more preferably 0.05% or less. Mo is not added in some cases in the present invention.

Nb: 0.01% or More and 0.05% or Less

Nb is a chemical element which is effective for increasing the strength of steel. Therefore, the Nb content is desirably set to be 0.01% or more, or preferably 0.015% or more. On the other hand, in the case where the Nb content is more than 0.05%, there is a decrease in the toughness of a weld zone. Therefore, the Nb content is advantageously set to be 0.01% or more and 0.05% or less.

Pcm* (%) (=C+Si/30+(Mn+Cu+Cr)/20+Ni/60+Mo/2+V/10, where atomic symbols respectively represent the contents (mass %) of the corresponding alloying chemical elements in the equation, and where the symbol of an alloying chemical element which is not contained is assigned a value of 0)≤0.20

Sample steel plates having various chemical compositions with different Pcm*'s within the range for the chemical composition according to aspects of the present invention were manufactured. The sample steel plates had a thickness of 27 to 101 mm by performing hot-rolling. A CTOD test was performed on the heat affected zones of the obtained sample steel plates.

A CTOD test was performed, using a test piece taken from a welded joint which was formed by performing multi-pass welding on the butted parts of the sample steel plates described above by using a submerged arc welding method with a heat input of 45 kJ/cm, under the conditions that the testing temperature was −10° C. and that a notch was formed in a coarse-grain region reheated in a dual-phase temperature range. The CTOD test was performed in accordance with API RP 2Z, and it was confirmed that the notch was formed in a coarse-grain region reheated in a dual-phase temperature range in the test piece which had been subjected to the test.

In addition, a test piece for a heat cycle simulation test was taken from the sample steel plates described above, and the test piece was subjected to a heat cycle equivalent to that to which a coarse-grain region reheated in a dual-phase temperature range is subjected, in order to determine the amount of MA. The amount of MA was defined as the area ratio of MA which was calculated as the average value of the ratios of the areas of MA which were observed in arbitrary cross sections of the steel plate in the rolling direction, the width direction, or the like with respect to the total observation fields of view.

FIG. 1 illustrates the relationship between Pcm* and a CTOD value. It is clarified that a CTOD value decreases with increasing Pcm*. This is thought to occur because a CTOD value decreases due to an increase in the amount of MA in the region described above (coarse-grain region reheated in a dual-phase temperature range) as a result of Pcm* increasing. Therefore, by controlling Pcm* to be 0.20 or less, it is possible to manufacture a steel plate for a thick-walled steel pipe having a CTOD value of 0.30 mm or more at a temperature of −10° C. in a CTOD test in which a notch is formed in a bond including a coarse-grain region reheated in a dual-phase temperature range in a weld zone formed as a result of performing multi-pass welding. In the case where Pcm* of a sample steel plate was 0.20 or less, the amount of MA determined by performing a heat cycle simulation test was 5.0% or less.

Embodiments of the chemical composition according to the present invention are as described above, and the remainder of the chemical composition consists of Fe and inevitable impurities. Moreover, at least one or more selected from among Al, Cu, Ni, Cr, and V may be added in order to increase strength and toughness as long as Pcm* is 0.20 or less.

Al: 0.005% or More and 0.1% or Less

Al is a chemical element which is added in order to deoxidize molten steel, and it is advantageous that the Al content be 0.005% or more. On the other hand, in the case where the Al content is more than 0.1%, there is a decrease in the toughness of a base material and a weld zone, and there is a decrease in toughness as a result of Al mixing into a weld metal zone due to dilution by welding. Therefore, the Al content is desirably limited to 0.1% or less, or preferably 0.08% or less.

Cu: 1.00% or Less

Cu is a chemical element which increases the strength of steel through precipitation strengthening. Such effect is realized in the case where the Cu content is 0.01% or more. In addition, in the case where the Cu content is excessively large, there may be a decrease in the surface quality of a steel plate due to hot brittleness. Therefore, in the case where Cu is added, it is preferable that the Cu content be 1.00% or less, or more preferably 0.50% or less.

Ni: 1.00% or Less

Ni is a chemical element which increases strength while maintaining the high toughness of a base material. Moreover, Ni is effective for stably increasing the CTOD performance of a HAZ. Such effect is realized in the case where the Ni content is 0.01% or more. However, since Ni is expensive, there may be an economic disadvantage in the case where the Ni content is large. Therefore, in the case where Ni is added, it is preferable that the Ni content be 1.00% or less.

Cr: 0.50% or Less

Cr is a chemical element which is effective for increasing the strength of a base material, and such effect is realized in the case where the Cr content is 0.01% or more. However, in the case where the Cr content is large, there may be a decrease in toughness. Therefore, in the case where Cr is added, the Cr content is advantageously set to be 0.50% or less, or preferably 0.20% or less.

V: 0.05% or Less

V is, like Nb, a chemical element which is effective for increasing the strength of steel. Such effect is realized in the case where the V content is 0.001% or more. However, in the case where the V content is more than 0.05%, there is a decrease in the toughness of a weld zone. Therefore, in the case where V is added, the V content is advantageously set to be 0.05% or less, or preferably 0.03% or less.

Microstructure:

The microstructure of a base material is formed so that the volume fraction of bainite is 50% or more in order to achieve a TS of 500 MPa or more. Here, the volume fraction of bainite is represented in terms of area ratio. There is no particular limitation on the remainder of the microstructure. As long as the effects of the present invention are not decreased, microstructures including structures other than bainite and MA and precipitations may also be included in the range according to the present invention. Examples of the remainder of the microstructure include ferrite (specifically, for example, polygonal ferrite), pearlite, and cementite. Since martensite causes a significant decrease in toughness, it is preferable that martensite not be included in the remainder of the microstructure.

In addition, in the case where the volume fraction of island martensite (MA) is more than 5.0% in a coarse-grain region reheated in a dual-phase temperature range, the Charpy toughness of a base material does not reach the target value at a temperature of −40° C. Even if the Charpy toughness of a base material reaches the target value at a temperature of −40° C., it is difficult to achieve such a satisfactory CTOD performance that a CTOD value is 0.30 mm or more at a temperature of −10° C. Therefore, the volume fraction of MA is advantageously set to be 5.0% or less, or preferably 3.5% or less.

It is possible to manufacture the steel plate for a thick-walled steel pipe according to aspects of the present invention by manufacturing a slab of steel having the chemical composition described above using a continuous casting method, subsequently by reheating the slab at a temperature (slab reheating temperature) of 1050° C. or higher and 1200° C. or lower, then by hot-rolling the reheated slab, and by performing accelerated cooling on the hot-rolled steel plate to a temperature of 550° C. or lower and 250° C. or higher after hot rolling has been performed.

In the case where the slab reheating temperature is lower than 1050° C., it is difficult to perform hot rolling thereafter. On the other hand, in the case where the slab reheating temperature is higher than 1200° C., there is a decrease in toughness. Therefore, the slab reheating temperature is preferably set to be 1050° C. or higher and 1200° C. or lower.

There is no particular limitation on what method is used for hot rolling. For example, by controlling the rolling reduction in a non-recrystallization temperature range (900° C. or lower) to be 40% or more, and by controlling the finish rolling temperature to be 700° C. to 850° C., the formation of fine crystal grains is promoted. As a result, it is possible to manufacture a material having high strength and satisfactory toughness for a base material.

After hot rolling has been performed, accelerated cooling is performed to a cooling stop temperature of 550° C. or lower and 250° C. or higher so that the volume fraction of bainite is 50% or more. Here, it is beneficial that the accelerated cooling be performed at a cooling rate of 5° C./sec. or more in order to allow bainite transformation to occur without performing isothermal holding after the accelerated cooling is performed. In the case where the cooling stop temperature is excessively high, since bainite transformation does not sufficiently progress, ferrite and pearlite are formed, which results in the volume fraction of bainite in the microstructure of a base material being less than 50%. Therefore, the cooling stop temperature is advantageously set to be 550° C. or lower, or preferably 500° C. or lower. On the other hand, in the case where the cooling stop temperature is excessively low, since martensite transformation progresses, the volume fraction of bainite in the microstructure of a base material is less than 50%, and there is a significant decrease in the toughness of a base material. Therefore, the cooling stop temperature is advantageously set to be 250° C. or higher, or preferably 300° C. or higher.

In the case where a steel pipe is manufactured from the steel plate for a thick-walled steel pipe manufactured using the manufacturing method described above, as is the case with an ordinary UOE steel pipe manufacturing method, the steel plate is formed into a cylindrical shape using a cold forming method, and the butted surfaces are welded by performing seam welding with one weld layer being formed on each of the inner and outer surfaces in order to form a steel pipe. An exemplary method will be described more specifically hereafter.

In embodiments of the present invention, a steel pipe is manufactured using the steel plate manufactured using the method described above. Examples of a method for forming a steel pipe include methods for forming the steel plate into a pipe shape by cold forming such as a UOE process and press bend (also referred to as bending press).

In a UOE process, by performing edge preparation on the edges in the width direction of a thick steel plate which is used as a raw material, by performing edge bending on the edges in the width direction of the steel plate using a pressing machine, and by subsequently forming the steel plate into a U-shape and further into an O-shape using a pressing machine, the steel plate is formed into a cylindrical shape so that the edges of the steel plate in the width direction face each other. Subsequently, the edges in the width direction of the steel plate facing each other are butted and welded. This welding is called seam welding. In the seam welding, it is preferable to use a method having a two-stage process including a tack welding process, in which the steel plate having a cylindrical shape is held and the edges in the width direction of the steel plate facing each other are butted and welded by performing tack welding, and a final welding process, in which submerged arc welding is performed on the inner and outer surfaces of the butted parts of the steel plate. After seam welding has been performed, pipe expansion is performed in order to eliminate welding residual stress and to improve the roundness of the steel pipe. In the pipe-expanding process, a pipe-expanding ratio (the ratio of a change in outer diameter due to the pipe expansion to the outer diameter before the pipe expansion) is usually 0.3% to 1.5%. It is preferable that the pipe-expanding ratio be 0.5% to 1.2% from the viewpoint of the balance between the roundness improvement effect and the capacity required for the pipe-expanding machine.

In the case of press bend, by repeatedly performing three-point bending on a steel plate to gradually change its shape, a steel pipe having an almost circular cross section is manufactured. Subsequently, seam welding is performed as is the case with a UOE process described above. Also in the case of press bend, pipe expansion may be performed after seam welding has been performed.

The obtained steel pipes are excellent in terms of CTOD performance in the heat affected zone formed as a result of performing girth welding.

In the case where girth welding is performed using a multilayer welding method, it is preferable that heat input per pass be 5 kJ/cm or more and 70 kJ/cm or less. In the case where the heat input per pass is excessively low, there is a decrease in the stability of welding conditions, and it is necessary to increase the number of welding passes. Therefore, it is preferable that the heat input per pass be 5 kJ/cm or more, or more preferably 6 kJ/cm or more. On the other hand, in the case where the heat input per pass is excessively large, the area of a local brittle region reheated in a dual-phase temperature range is increased. Therefore, it is preferable that the heat input per pass be 70 kJ/cm or less, or more preferably 50 kJ/cm or less.

EXAMPLES OF THE PRESENT INVENTION

Using steel slabs having various chemical compositions given in Table 1 as raw materials, thick steel plates having a thickness of 27 to 101 mm were manufactured under the manufacturing conditions given in Table 2. A tensile test, a Charpy impact test, and a CTOD test were performed on each of the obtained thick steel plates. Here, although it is not described in Table 2, the rolling reduction in a non-recrystallization temperature range (900° C. or lower) was 40% or more in the hot rolling process. In addition, the cooling rate was 5° C./sec. or more in the accelerated cooling process.

Using a tensile test piece in the rolling width direction which had been cut out of the central portion in the thickness direction of each steel plate, a tensile test was performed in order to determine a tensile strength (TS). A Charpy test was performed using a test piece having a 2 mm V-notch at a test temperature of −40° C. in order to obtain a Charpy impact value (average for 3 test pieces).

In addition, by forming a single-bevel groove (having a groove angle of 30°) in a welding test plate which had been taken from each steel plate, and by preparing a welded joint by performing multi-pass welding using a submerged arc welding method with a heat input of 45 kJ/cm, a CTOD test was performed at a test temperature of −10° C. on a test piece having a notch in a bond which was extending almost linearly in the thickness direction. Here, the CTOD test piece was prepared and the test conditions were determined in accordance with API RP 2Z, and it was confirmed that a coarse-grain region reheated in a dual-phase temperature range was included in the bond in which the notch was formed.

Moreover, UOE steel pipes were manufactured from steel plates Nos. 1 through 7 using an ordinary method, and, using test pieces taken from the steel pipes, tensile strength (TS) and a Charpy impact value at a test temperature of −40° C. (average for 3 test pieces) were obtained. Using a CTOD test piece taken from the heat affected zone of the weld zone formed as a result of performing girth welding for joining the steel pipes, a CTOD test was performed using a method similar to that used for a test on the welded joint formed by performing multi-pass welding of steel plates.

The results of the tests described above are given in Table 2. From the test results given in Table 2, it is clarified that all the steel materials of the examples of the present invention had a tensile strength TS of 500 MPa or more and toughness of a Charpy absorbed energy (vE-40° C.) of 250 J or more, which means that these steel plates were excellent in terms of strength and toughness of a base material. Moreover, the CTOD value of a welded joint formed by performing multi-pass welding was 0.30 mm or more, which means that the examples of steel plates according to the present invention were also excellent in terms of the toughness of a heat affected zone formed as a result of multi-pass welding.

In addition, in the case of the steel pipes which were manufactured by performing cold forming on the steels according to aspects of the present invention, although there was a slight decrease in the CTOD value of the weld zone formed as a result of performing girth welding, these steel pipes showed satisfactory results.

On the other hand, the comparative example steels, which had chemical compositions and Pcm* which were out of the ranges according to aspects of the present invention, were poor in terms of strength, the toughness of a base material, and CTOD value. In the case of comparative example steels 1 and 2, although the toughness of a base material at a temperature of −40° C. was high due to the chemical compositions having the contents of the alloying chemical elements within the desirable ranges according to aspects of the present invention, a CTOD value was low due to Pcm* being more than 0.20. Comparative example steel 3 was poor in terms of the toughness of a base material due to C content being excessively high. In addition, comparative example steel 4 was poor in terms of TS due to C content being low. Comparative example steels 5, 6, 8, and 10 were poor in terms of the toughness of a base material due to Si content, Mn content, S content, and Nb content being excessively higher respectively than the desirable ranges according to the present invention. Although comparative example steels 7 and 9 were satisfactory in terms of the toughness of a base material, these steels were poor in terms of CTOD value due to P content and Mo content being excessively higher respectively than the desirable ranges according to the present invention.

As indicated in Table 2, there was a tendency for the steel pipes which were manufactured from the examples of steels of embodiments of the present invention to have a slightly lower CTOD values in a welded joint formed by performing girth welding than those in base material. However, since these pipes had CTOD values of 0.3 mm or more representing a satisfactory property, these pipes can suitably be used, for example, for marine structures and pipe lines which are required to have high toughness in a heat affected zone formed as a result of performing girth welding and which are used in harsh environments.

TABLE 1

(mass %)

| No. | Thickness | C | Si | Mn | P | S | Al | Cu | Ni | Cr | Mo | Nb | V | Pcm* | Note |
|---|---|---|---|---|---|---|---|---|---|---|---|---|---|---|---|
| 1 | 101 | 0.09 | 0.14 | 1.57 | 0.005 | 0.0009 | 0.035 | 0.31 | 0.83 | | | 0.025 | | 0.20 | Example Steel 1 |
| 2 | 76 | 0.07 | 0.19 | 1.47 | 0.005 | 0.0007 | 0.028 | 0.19 | 0.32 | | | 0.015 | | 0.16 | Example Steel 2 |
| 3 | 30 | 0.07 | 0.08 | 1.65 | 0.004 | 0.0005 | 0.033 | 0.24 | 0.15 | 0.17 | | 0.022 | | 0.17 | Example Steel 3 |
| 4 | 44 | 0.05 | 0.14 | 1.63 | 0.005 | 0.0008 | 0.031 | 0.24 | 0.30 | 0.16 | | 0.023 | | 0.16 | Example Steel 4 |
| 5 | 43 | 0.050 | 0.17 | 1.50 | 0.003 | 0.0011 | 0.035 | | 0.30 | 0.15 | 0.10 | 0.028 | | 0.19 | Example Steel 5 |
| 6 | 31 | 0.04 | 0.15 | 1.55 | 0.009 | 0.0010 | 0.041 | 0.02 | 0.07 | 0.27 | 0.16 | 0.020 | | 0.22 | Comparative Example Steel 1 |
| 7 | 27 | 0.04 | 0.13 | 1.40 | 0.005 | 0.0013 | 0.036 | 0.02 | 0.14 | 0.23 | 0.17 | 0.030 | 0.043 | 0.22 | Comparative Example Steel 2 |
| 8 | 65 | 0.16 | 0.13 | 1.52 | 0.015 | 0.0029 | 0.004 | | 0.61 | | | 0.012 | | 0.25 | Comparative Example Steel 3 |
| 9 | 55 | 0.025 | 0.13 | 1.55 | 0.005 | 0.0020 | 0.029 | | 0.57 | | | | 0.028 | 0.12 | Comparative Example Steel 4 |
| 10 | 55 | 0.08 | 0.58 | 1.54 | 0.007 | 0.0017 | 0.023 | 0.21 | 0.98 | | | | | 0.21 | Comparative Example Steel 5 |
| 11 | 55 | 0.06 | 0.20 | 2.17 | 0.004 | 0.0015 | 0.021 | 0.14 | 0.81 | | | | 0.026 | 0.20 | Comparative Example Steel 6 |
| 12 | 55 | 0.09 | 0.17 | 1.46 | 0.019 | 0.0022 | 0.03 | 0.21 | 0.40 | | | | | 0.19 | Comparative Example Steel 7 |
| 13 | 55 | 0.07 | 0.19 | 1.44 | 0.004 | 0.0056 | 0.022 | | 0.55 | | 0.18 | | | 0.25 | Comparative Example Steel 8 |
| 14 | 65 | 0.09 | 0.19 | 1.32 | 0.010 | 0.0024 | 0.002 | | 0.05 | | 0.25 | | | 0.29 | Comparative Example Steel 9 |
| 15 | 55 | 0.07 | 0.06 | 1.52 | 0.008 | 0.0012 | 0.021 | 0.11 | 0.96 | 0.12 | | 0.059 | 0.018 | 0.18 | Comparative Example Steel 10 |

Annotation 1: An underlined portion printed in bold indicates a value out of the range according to the present invention.
Annotation 2: Pcm* = C + Si/30 + (Mn + Cu + Cr)/20 + Ni/60 + Mo/2 + V/10,
where atomic symbols respectively represent the contents (mass %) of the corresponding alloying chemical elements.

TABLE 2

| | Manufacturing Condition | | | Microstructure | | Plate Property | | | Pipe Property | | | |
|---|---|---|---|---|---|---|---|---|---|---|---|---|
| | | Finishing | Cooling | | | | | | | | | |
| No. | Reheating Temperature (°C.) | Delivery Temperature (°C.) | Stop Temperature (°C.) | Volume Fraction of Bainite (%) | Volume Fraction of HAZ-MA (%) | TS (MPa) | vE-40 (J) | CTOD (mm) | TS (MPa) | vE-40 (J) | CTOD (mm) | Note |
| 1 | 1070 | 700 | 360 | 95 | 4.3 | 545 | 251 | 0.41 | 541 | 262 | 0.33 | Example Steel 1 |
| 2 | 1050 | 730 | 400 | 81 | 3.5 | 513 | 379 | 0.72 | 514 | 334 | 0.57 | Example Steel 2 |
| 3 | 1150 | 760 | 350 | 95 | 2.4 | 634 | 354 | 1.32 | 623 | 366 | 1.21 | Example Steel 3 |
| 4 | 1150 | 790 | 400 | 92 | 0.3 | 583 | 463 | 2.70 | 585 | 466 | 1.83 | Example Steel 4 |
| 5 | 1150 | 800 | 395 | 87 | 4.8 | 601 | 372 | 0.38 | 598 | 356 | 0.34 | Example Steel 5 |
| 6 | 1090 | 830 | 550 | 91 | 2.7 | 582 | 394 | 0.16 | 578 | 414 | 0.17 | Comparative Example Steel 1 |
| 7 | 1080 | 790 | 450 | 90 | 2.6 | 615 | 361 | 0.23 | 608 | 342 | 0.18 | Comparative Example Steel 2 |
| 8 | 1115 | 740 | 350 | 84 | 4.3 | 615 | 46 | — | — | — | — | Comparative Example Steel 3 |
| 9 | 1115 | 790 | 270 | 64 | 0.2 | 488 | 381 | — | — | — | — | Comparative Example Steel 4 |
| 10 | 1120 | 790 | 280 | 80 | 5.1 | 687 | 103 | — | — | — | — | Comparative Example Steel 5 |
| 11 | 1145 | 790 | 350 | 72 | 6.8 | 788 | 18 | — | — | — | — | Comparative Example Steel 6 |
| 12 | 1100 | 850 | 340 | 77 | 4.1 | 625 | 258 | 0.12 | — | — | — | Comparative Example Steel 7 |
| 13 | 1150 | 850 | 260 | 83 | 6.2 | 523 | 82 | — | — | — | — | Comparative Example Steel 8 |
| 14 | 1160 | 810 | 350 | 85 | 7.2 | 528 | 258 | 0.24 | — | — | — | Comparative Example Steel 9 |
| 15 | 1125 | 800 | 280 | 75 | 3.8 | 688 | 201 | — | — | — | — | Comparative Example Steel 10 |

Annotation 1: Target Properties TS (MPa) ≥ 500, vE-40 (J) ≥ 250,
CTOD value (testing temperature: −10° C.) of a welded joint formed by performing multi-pass welding (plate or pipe) ≥ 0.30 mm
Annotation 2: TS and vE-40 of plate property are for a test piece taken in the rolling width direction of a parent metal.
CTOD value is for a CGHAZ adjacent to a welded joint formed by performing multi-pass welding with a single-bevel groove.
TS and vE-40 of pipe property are for a test piece taken in the circumferential direction of a pipe.
CTOD value is for a CGHAZ portion.

The invention claimed is:

1. A steel plate for a thick-walled steel pipe with a CTOD value at −10° C. of 0.30 mm or more in a heat affected zone formed as a result of performing girth welding, the steel plate having a chemical composition consisting of, by mass %,
C: 0.030% or more and 0.10% or less,
Si: 0.05% or more and 0.50% or less,
Mn: 1.00% or more and 1.80% or less,
P: 0.015% or less,
S: 0.005% or less,
Mo: 0.20% or less,
Nb: 0.01 or more and 0.05% or less, and
optionally, one or more of Al: 0.005% or more and 0.1% or less, Cu: 1.00% or less, Ni: 1.00% or less, Cr: 0.50% or less, and V: 0.05% or less; and the balance being Fe and inevitable impurities, in which $$Pcm^* (\%) (=C+Si/30+(Mn+Cu+Cr)/20+Ni/60+Mo/2+V/10,$$

where atomic symbols respectively represent the contents (mass %) of the corresponding alloying chemical elements in the equation, and where the symbol of an alloying chemical element which is not contained is assigned a value of 0) is 0.20 or less, wherein a fraction of bainite in a base material of the steel plate in terms of area ratio is 50% or more, and wherein a fraction of island martensite (MA) in terms of area ratio, which is generated in a coarse-grain region reheated in a dual-phase temperature range when the steel plate is subjected to multilayer welding performed with a heat input per pass of 5 kJ/cm or more and 70 kJ/cm or less is 5.0% or less.

2. The steel plate for a thick-walled steel pipe with a CTOD value at −10° C. of 0.30 mm or more in a heat affected zone formed as a result of performing girth welding according to claim 1, in which Pcm* is 0.17 or less.

3. A thick-walled high-strength steel pipe with a CTOD value at −10° C. of 0.30 mm or more in a heat affected zone formed as a result of performing girth welding, the steel pipe being manufactured by forming the steel plate for a thick-walled steel pipe according to claim 1 into a cylindrical shape by performing cold forming, and by performing seam welding on butted surfaces with one weld layer being formed on each of the inner and outer surfaces in order to form a steel pipe.

4. A method for manufacturing a steel plate for a thick-walled steel pipe with a CTOD value at −10° C. of 0.30 mm or more in a heat affected zone formed as a result of performing girth welding, the method comprising manufacturing a steel slab having the chemical composition according to claim 1 using a continuous casting method, subsequently reheating the slab at a temperature of 1050° C. or higher and 1200° C. or lower, then hot-rolling the reheated slab, and performing accelerated cooling on the hot-rolled steel plate to a temperature of 550° C. or lower and 250° C. or higher after hot rolling has been performed.

* * * * *